United States Patent Office 3,244,542
Patented Apr. 5, 1966

---

3,244,542
WATER-DISPERSIBLE METALLIC FLAKE PIG-
MENTS AND READY-MIXED COATING FORMU-
LATIONS CONTAINING THE SAME
Melvin H. Brown and Rolf Rolles, Allegheny Township,
Westmoreland County, Pa., assignors to Aluminum
Company of America, Pittsburgh, Pa., a corporation
of Pennsylvania
No Drawing. Filed Nov. 26, 1962, Ser. No. 240,126
13 Claims. (Cl. 106—277)

This invention relates in general to ready-mixed coating formulations containing metallic flake pigmentation, and more particularly it relates to the incorporation of aluminum flake pigmentation in aqueous dispersions of film-forming agents to provide ready-mixed coating formulations. The invention is also addressed to dry metallic powder and paste formulations, and specifically dry aluminum flake and paste formulations, in which the metallic pigmentation has been treated to provide the surfaces of the individual flakes thereof with a protective film inhibiting corrosive attack of the metallic pigmentation by water.

It is a well-known fact that metallic pigments, and particularly aluminum flake pigments, are seriously affected on contact with or exposure to even trace quantities of water, in sealed containers of formulations containing the metallic flake pigments, with the effect of the water being most notably observed in the development of gas pressure within sealed containers of the formulations, accompanied with loss of luster, gloss, brilliance and natural color of the metallic flake component or pigmentation of the formulations.

As a natural consequence of these known and experienced observations, metallic flake pigments have not been too successfully employed in commerce in the manufacture of ready-mixed water-dispersed film-forming coating formulations, such as paints, or in water-dispersible concentrated metallic flake paste formulations for subsequent use in formulating ready-mixed flowable paint formulations, on account of the presence of the water phase forming a large proportion of such metallic flake formulations.

The present invention is commercially applicable to the manufacture of ready-mixed metallic flake pigmented paste and paint formulations, containing water, in the absence of pressure-development within sealed containers of such aqueous formulations. The sources of the water in the formulations contemplated within the scope of the invention are many fold and include a wide variety of conventional vehicles employed in the manufacture of paint and coating formulations which have not been heretofore successful in admixture with metallic flake pigmentation in sealed container storage because of their appreciably large available water content.

For example, pressure-development in sealed containers has been encountered through incoropartion of metallic, and specifically aluminum, flake pigments in water-dispersion type vehicles of the so-called latex type which include one or more film-forming agents of essentially water-insoluble character in uniform suspension in water or equivalent aqueous phases or vehicles. The film-forming agents in such aqueous vehicles may be in the form of natural or synthetic resins inclusive of various polymeric products, natural and synthetic rubber compounds, and such conventional other film-forming substances or binders which are capable of dispersion as a suspension or emulsion in water and which, following application on a surface and allowed to set or dry, by evaporation of their liquid content, form coherent dried coatings or films.

Butadiene styrene, acrylic ester resins, and polyvinyl acetate homo and copolymers are examples of essentially solid film-forming agents, which in suspension in water form solid-in-liquid emulsions designated herein and in the prior art "latex" type vehicles. Alkyd resins and tar products are examples of essentially liquid film-forming agents, which in suspension in water can form liquid-in-liquid emulsions designated herein and in the prior art "emulsion" type vehicles. Both general types or classes of vehicles above described, whether constituting solid-in-liquid or liquid-in-liquid "latex" or "emulsion" type vehicles, respectively, contain appreciable amounts of water and are hereinafter referred to in the specification and claims as "water base" vehicles, which are characterized by their incapability of admixture with metallic flake pigmentation, and specifically aluminum flake pigmentation, in the absence of pressure-development in sealed containers of such formulations.

From the foregoing statements, it will be appreciated that a primary object of the invention is to provide metallic, and specifically aluminum, flake pigment formulations characterized by substantial freedom from gas pressure-development in the presence of appreciable quantities of available water in sealed containers of the same.

Another object of the invention is to provide ready-mixed metallically pigmented paint and flowable coating formulations containing water base vehicles characterized by substantial freedom from gas pressure-development of the formulations in sealed containers of the same.

A further object of the invention is to provide inhibited dry metallic flake pigments suitable for incorporation in water base vehicle formulations.

Other objects and advantages will present themselves to those skilled in the art to which the invention appertains on consideration of the following description and specific examples of the invention.

Metallic pigments, including aluminum flake pigments, are regularly and conventionally manufactured in dry powder and concentrated paste forms, the dry product being producible commercially in dry hammer mills, or vacuumized and dried from a conventional commercial paste product as produced in a wet ball-milling operation. In either form, one or more conventional fatty acid lubricants are normally employed in the disintegration or comminution of the metallic flake pigments, which lubricants remain as thin film layers or surface coatings on the metallic flakes in the paste or dry forms of the metallic flake pigmentation. In this regard, at least one leaf-producing fatty acid lubricant, such as stearic and palmitic acids, is conventionally employed in the production of a leafing grade metallic flake pigment, whereas at least one of the non-leafing fatty acids, such as oleic, lauric, and ricinoleic, is regularly employed in the production of a non-leafing grade of metallic flake pigment. The wet ball-milling process also conventionally employs the use of a volatile hydrocarbon solvent or thinner, such as commercial grade mineral spirits, in sufficient amount to provide the desired consistency of a commercial paste formulation, which solvent may be conventionally driven off, as by vacuumized drying, in the commercial production of dry metallic powders or pigments.

Regardless of the method employed in obtaining metallic flake pigments responding to the invention, we have discovered that gas pressure-development and loss of the above-stated inherent properties of metallic flake pigmentation, in sealed containers of water-containing or water base formulations thereof, can be prevented by reaction between or exposure of the metallic flakes to at least one inhibitor selected from the group consisting of 3- and 5-nitrosalicylic acids. Apparently the inhibitors, singly or in combination, inhibit or neutralize destructive chemical reaction between the available water and metallic pigmentation in the formulations of the invention which has presumably been heretofore responsible for gas pressure-development in sealed containers of the non-inhibited formulations.

The complained of gas pressure-development facing the water-base metallically-pigmented art has been eliminated in sealed containers of metallic pigment formulations consisting essentially by weight of 7 to 80 percent aluminum flakes, 0.1 to 4 percent of at least one conventional fatty acid lubricating agent, such as stearic, palmitic, oleic, lauric and ricinoleic acids, 20 to 90 percent available water, and 0.1 to 8 percent of at least one inhibitor selected from the group consisting of 3- and 5-nitrosalicylic acids, which range of compositions by weight include ready-mixed water-containing pastes and water base paint formulations. We have also observed that leafing grade metallic flake pigments characterized by their manufacture in the presence of stearic and/or palmitic fatty acid lubricant respond slightly more favorably than do non-leafing grade metallic flake pigments characterized by their manufacture in the presence of at least one of the non-leafing fatty acid lubricants oleic, lauric and ricinoleic in the water-containing or water base metallic flake pigment formulations to which the invention is addressed.

In accordance with commercial practice in the paint industry, it is within conventional practices to include surface active wetting agents, antifoaming agents, color-imparting compounds and viscosity controlling agents in water base ready-mixed pastes, paints or flowable coating formulations. To this end one or more of the hereinafter identified exemplary agents and/or compounds may be included in metallic flake paste pigments and ready-mixed paint formulations falling within the scope of the invention without detracting from the beneficial presence of the 3- and 5-nitrosalicylic acid inhibitors.

Wetting agents which have respond satisfactorily in the practice of the invention have included at least one of the water soluble compounds selected from the group consisting of aryl alkyl sulfonates and non-ionic ethylene oxide condensates in amounts of 0.1 to 12 percent by weight of the water-containing paste and ready-mixed paint formulations of the invention, preferably in total amount by weight not exceeding 20 percent.

Color-imparting compounds have similarly respond in amounts of 5 to 50 percent by weight of the latex type ready-mixed paints or coating formulations and have included conventional insoluble organic and inorganic dry pigments, flushed colors, and colors-in-oil, in addition to viscosity-controlling agents such as a 3 percent in water solution of methylcellulose, with the latter compound present in amounts between 0.1 and 8 percent by weight of the ready-mixed formulations.

Silicone antifoaming agents in amounts of 0.01 to 1.5 percent by weight of the water-containing or water base metallic flake paste pigment and ready-mixed paint and coating formulations have also been successfully employed in the practice of the invention.

Specific examples of aluminum flake paste pigment formulations and ready-mixed paint or flowable coating formulations, falling within the scope of the invention, were prepared and tested under laboratory controlled conditions, as follows:

EXAMPLE I

A dry aluminum flake powder, having a surface coating of stearic acid on the flakes thereof, was mixed with water, preferably distilled or deionized water, in which 5-nitrosalicylic acid and an aryl alkyl sulfonate wetting agent had been dissolved to give a synthetic aluminum flake paste pigment formulation having the approximate nominal composition by weight 62.5 percent aluminum flake pigment, 2.5 percent stearic acid leafing lubricant, 31.8 percent water, 0.2 percent aryl alkyl sulfonate wetting agent, and 3 percent 5-nitrosalicylic acid inhibitor.

The paste pigment so prepared was packaged in sealed containers provided with approved pressure-measuring devices and shelf stored at room temperature. Observance of the pressure-measuring devices at regular intervals through a four month shelf storage period failed to reveal any evidence of pressure development within the sealed containers. The aluminum flake paste pigment was also inspected following the four month storage and found to have retained its original paste consistency, as well as retaining the initial natural color and brilliance of its leafing aluminum flake pigmentation.

EXAMPLE II

A second aluminum flake paste pigment tested and displaying the same results and properties reported for Example I had the following nominal composition by weight, namely, 62.5 percent aluminum flake pigment, 2.5 percent stearic acid leafing lubricant, 0.2 percent aryl alkyl sulfonate wetting agent, 31.8 percent water, and 3 percent 3-nitrosalicyclic acid inhibitor.

EXAMPLE III

A third aluminum flake paste pigment formulation consisted essentially by weight of 34 percent aluminum flake pigment, 0.4 percent non-leafing oleic acid lubricant, 2 percent non-ionic ethylene oxide condensate wetting agent, 60 percent water, preferably distilled water, and 3.6 percent 3-nitrosalicyclic acid inhibitor. This paste pigment formulation displayed the same properties as Examples I and II during four months shelf storage at room temperature in sealed containers.

EXAMPLE IV

Ready-mixed water base latex type paints or flowable coating formulations were prepared from paste pigment formulations of the nominal composition of Example I to the following composition:

| Components | Parts | Percent by Weight |
|---|---|---|
| Leafing aluminum flake powder (2.5 percent stearic acid on the flakes) | 33 | 10.60 |
| Water in paste formulation | 37 | 11.90 |
| Aryl alkyl sulfonate wetting agent in paste | 1.5 | .49 |
| 5-nitrosalicylic acid inhibitor in paste | 0.56 | .18 |
| Butadiene styrene latex vehicle (50% water content) | 225 | 72.33 |
| 3% in water methylcellulose viscosity-controlling compound | 13 | 4.20 |
| Silicone antifoaming agent | 1 | .30 |
| Totals | 311.06 | 100.00 |

This ready-mixed water base paint formulation did not develop pressure within sealed containers of the same over a four month period of shelf storage at room temperature and was brush coated and air dried on steel panels with entire satisfaction following its storage.

EXAMPLE V

Additional ready-mixed water base latex type paints were prepared by mixing a water-containing non-leafing aluminum flake paste pigment formulation with a commerical water-containing polyvinyl acetate latex vehicle (50 percent by weight water) to produce latex base ready-mixed paints having nominal compositions by weight 10.5 percent aluminum flakes, 0.1 percent oleic acid non-leafing lubircating agent on the surfaces thereof, 0.5 percent non-ionic ethylene oxide condensate wetting agent, 72.4 percent water from the latex vehicle, 11.6 percent water, preferably distilled water, from the initial non-leafing aluminum paste pigment formulation, 4.20 percent methylcellulose viscosity-controlling compound or agent introduced in the form of a 3 percent solution in water, 0.33 percent silicone antifoaming agent, and 0.37 percent 5-nitrosalicylic acid inhibitor.

These ready-mixed aluminum pigmented polyvinyl acetate water base paint formulations did not develop pressure within sealed containers of the same over a four month storage period at room temperature. The paints so stored were also employed to produce air dried films of superior gloss and brilliance.

EXAMPLE VI

Ready-mixed paint formulations have also been prepared and tested for pressure-development in sealed containers of the same employing water base bitumastic tar emulsion type vehicles. The paint formulations in this instance were prepared by dissolving 1.5 parts of aryl alkyl sulfonate wetting agent and 0.6 parts 5-nitrosalicylic acid inhibitor in 37 parts distilled water and thereafter adding the water dissolved named components by mild stirring agitation to 154 parts of a bituminous tar emulsion type vehicle containing substantially 40 to 50 percent by weight available water content. On complete dispersion of the above-modified vehicles, 37 parts of leafing aluminum dry flake pigment, having a 2.5 percent by weight surface film coating of stearic acid on the flakes, was stirred into the modified tar emulsion vehicle to thereby produce a ready-mixed paint formulation exhibiting an initial viscosity of approximately 125 Krebs units. Converting to percent by weight, the bitumastic ready-mixed paints so produced had nominal compositions of:

| Components | Parts | Percent by Weight |
|---|---|---|
| Leafing aluminum flake powder (2.5 percent stearic acid on the flakes) | 37 | 16.08 |
| Aryl alkyl sulfonate wetting agent | 1.5 | .65 |
| 5-nitrosalicylic acid inhibitor | 0.6 | .26 |
| Bituminous tar emulsion vehicle (45 percent water content) | 154 | 66.93 |
| Distilled water | 37 | 16.08 |
| Totals | 230.1 | 100.00 |

The water base ready-mixed bituminous tar emulsion paints prepared in accordance with the above formulation did not develop pressure within sealed containers of the same over an eighteen month period of shelf storage at room temperature and thereafter responded satisfactorily to brush and spray application on steel panels to produce coherent dry paint films.

Analysis of tests carried out on the invention, and laboratory records in support of the same, have established that aluminum flake pigments provided with a flake surface layer or coating of a conventional fatty acid lubricant, as a consequence of their conventional manufacture, can be inhibited against pressure-development in contact and/or admixture with appreciable amounts of water in sealed containers of the same in shelf storage at room temperature, by additions to water-containing metallic flake pigmented formulations of at least one of the inhibitors selected from the group consisting of 3- and 5-nitrosalicylic acids. The named inhibitors are readily soluble in water, and to some lesser degree in conventional organic solvents of the general type normally present in small amounts in liquid-in-liquid emulsion vehicles of the aforementioned alkyd resin and tar emulsion type.

No attempt is herein made to describe the precise mechanism or system produced by the incorporation of the inhibitors 3- and 5-nitrosalicylic acid in the water-dispersible paste and ready-mixed paint or coating formulations of the invention. It is believed, however, that the inhibitors impart protective properties to the surfaces of metal flakes, without interfering in any appreciable manner with the fatty acid lubricants carried by the flake pigmentation, against corrosive attack by available water.

This explanation is borne out by the discovery that dry metallic flake pigments, whether produced from synthetically prepared water-containing pastes in accordance with Examples I, II and III, or wet-ball milled in the presence of a volatile hydrocarbon, and including in their liquid paste state formulation an addition of at least one of the inhibitors 3- and 5-nitrosalicylic acids, with or without an initial addition of a conventional wetting agent of the general type described above, have retained the inhibitor or inhibitors in protective film-forming association with the surfaces of the individual dry metallic flake pigments so produced.

In the preferred practices of the invention, ready-mixed metallic flake, and specifically aluminum flake, water base paint formulations exhibiting freedom from pressure-development in sealed containers of the same have been prepared to the following compositions by weight:

| Components: | Percent by weight |
|---|---|
| Leafing or non-leafing aluminum flake powder | 4 to 20 |
| Fatty acid lubricant | 0.2 to 2 |
| 3- and/or 5-nitrosalicylic acid inhibitor | 0.1 to 3 |
| Available water | 47 to 90 |
| Solids in water base vehicles | 10 to 60 | with or without additions of one or more of the following earlier identified constituents:

| Constituents: | Percent by weight |
|---|---|
| Wetting agents | 0.1 to 12 |
| Color-imparting compounds | 5 to 50 |
| Viscosity-controlling agents | 0.1 to 8 |
| Antifoaming agents | 0.01 to 1.5 |

Similarly, synthetic water-containing aluminum flake paste formulations prepared to the following compositions by weight have been stored in sealed containers without developing gas-pressure:

| Components: | Percent by weight |
|---|---|
| Aluminum flake powder (0.1 to 4 percent by weight fatty acid lubricant on flakes) | 55 to 80 |
| At least one wetting agent selected from aryl alkyl sulfonates and non-ionic ethylene oxide condensates | 1 to 8 |
| At least one of the inhibitors 3- and 5-nitrosalicylic acids | 1 to 8 |
| Available water | 10 to 30 |

Dry powder inhibited aluminum flake pigments have also been produced by vacuum drying and/or evaporation of the liquid contents of synthetically prepared water-containing paste formulations falling within the above-stated synthetic paste compositions, as well as from conventional volatile hydrocarbon-containing, water-free pastes, modified by additions thereto of the above named inhibitors and wetting agents. Dry flake pigments thus produced exhibited surface associated film layers protecting the individual flake particles against corrosive attack in subsequent contact with available water, the associated film layers comprising 0.1 to 4 percent by weight of at least one of the fatty acids stearic, palmitic, oleic, lauric and ricinoleic, 1 to 8 percent by weight of at least one of the inhibitors 3- and 5-nitrosalicylic acids, and 1 to 8 percent by weight of at least one of the wetting agents selected from aryl alkyl sulfonates and non-ionic ethylene oxide condensates.

The examples appearing hereinabove have been selected for purposes of illustrating and describing the invention and are in no sense intended to impart limitations to the scope thereof.

What is claimed is:

1. A metallic flake pigment compatible with and adaptable for dispersion in water base film-forming vehicles containing 20 to 90 percent by weight available water in the production of ready-mixed metallically-pigmented coating formulations characterized by freedom from pressure-development in sealed containers of the same, said metallic pigment flakes having a thin film surface layer of fatty acid lubricant and being inhibited against destructive chemical corrosive attack by available water by at least one acid selected from the group consisting of 3- and 5-nitrosalicylic acids associated with the surfaces of the flakes.

2. An aluminum flake pigment compatible with and adaptable for dispersion in water base film-forming vehicles containing 20 to 90 percent by weight available water in the production of ready-mixed aluminum-pigmented coating formulations characterized by freedom from pressure-development in sealed containers of the same, said aluminum pigment flakes having a thin film surface layer of fatty acid lubricant and being inhibited against destructive chemical corrosive attack by available water by at least one film-forming acidic inhibitor associated with the surfaces of the aluminum flakes and selected from the group consisting of 3- and 5-nitrosalicylic acids.

3. An aluminum flake pigment compatible with and adaptable for dispersion in water base film-forming vehicles containing 20 to 90 percent by weight available water in the production of ready-mixed aluminum-pigmented coating formulations characterized by freedom from pressure-development in sealed containers of the same, said aluminum pigment flakes having a thin film surface layer of fatty acid lubricant and being inhibited against destructive chemical corrosive attack by available water by at least one film-forming acidic inhibitor associated with the surfaces of the aluminum flakes and selected from the group consisting of 3- and 5-nitrosalicylic acids, and said inhibitor being present in amounts of 1 to 8 percent of the weight of the aluminum flake pigment.

4. An aluminum flake pigment compatible with and adaptable for dispersion in water base film-forming vehicles containing 20 to 90 percent by weight available water in the production of ready-mixed aluminum-pigmented coating formulations characterized by freedom from pressure-development in sealed containers of the same, the individual flake surfaces of the pigment having a coating layer associated therewith consisting by weight essentially of 0.1 to 4 percent of at least one fatty acid lubricant selected from the group consisting of stearic, palmitic, oleic, lauric and ricinoleic acids, 1 to 8 percent of at least one of the wetting agents selected from aryl alkyl sulfonates and non-ionic ethylene oxide condensates, and 1 to 8 percent of at least one inhibitor selected from the group consisting of 3- and 5-nitrosalicylic acids.

5. Aqueous film-forming metallic flake pigment formulations containing 20 to 90 percent by weight available water and characterized by freedom from pressure-development in sealed containers of the same, said formulations consisting in addition by weight essentially of 7 to 80 percent metallic flakes, 0.1 to 4 percent of at least one fatty acid lubricant on the surfaces of the flakes selected from the group consisting of stearic, palmitic, oleic, lauric and ricinoleic acids, 0.1 to 12 percent of a wetting agent compatible with the formulations, and 0.1 to 8 percent of at least one metallic flake surface film-forming inhibitor selected from the group consisting of 3- and 5-nitrosalicylic acids.

6. Aqueous film-forming aluminum flake pigment formulations containing 20 to 90 percent by weight available water and characterized by freedom from pressure-development in sealed containers of the same, said formulations consisting in addition by weight essentially of 7 to 80 percent aluminum flakes, 0.1 to 4 percent of at least one fatty acid lubricant on the surfaces of the flakes selected from the group consisting of stearic, palmitic, oleic, lauric and ricinoleic acids, 0.1 to 12 percent of a wetting agent compatible with the formulations, and 0.1 to 8 percent of at least one aluminum flake surface film-forming inhibitor selected from the group consisting of 3- and 5-nitrosalicylic acids.

7. Aqueous film-forming aluminum flake paste pigment formulations containing 10 to 30 percent by weight available water characterized by freedom from pressure-development in sealed containers of the same, said paste formulations consisting in addition by weight essentially of 55 to 80 percent aluminum flakes, 0.1 to 4 percent of at least one fatty acid lubricant selected from the group consisting of palmitic, stearic, oleic, lauric and ricinoleic acids, 1 to 8 percent of at least one wetting agent selected from the group consisting of aryl alkyl sulfonates and non-ionic ethylene oxide condensates, and 1 to 8 percent of at least one aluminum flake surface film-forming inhibitor selected from the group consisting of 3- and 5-nitrosalicyclic acids.

8. Aqueous film-forming water base aluminum flake ready-mixed paint formulations, the vehicles containing 47 to 90 percent by weight available water and 10 to 60 percent by weight solids, said formulations being characterized by freedom from pressure-development in sealed containers of the same, said ready-mixed paint formulations consisting in addition by weight essentially 4 to 20 percent aluminum flakes, 0.2 to 2 percent of at least one fatty acid lubricant selected from the group consisting of stearic, palmitic, oleic, lauric and ricinoleic acids, 0.1 to 3 percent of at least one wetting agent selected from the group consisting of aryl alkyl sulfonates and non-ionic ethylene oxide condensates, and 0.1 to 3 percent of at least one aluminum flake film-forming inhibitor selected from the group consisting of 3- and 5-nitrosalicylic acids.

9. Aqueous film-forming latex ready-mixed paint formulations, the vehicles of which contain 47 to 90 percent by weight available water and 10 to 60 percent by weight solids, in admixture with aluminum flake pigmentation and characterized by substantial freedom from pressure-development in sealed containers, said pigmentation of the formulations consisting essentially by weight of 4 to 20 percent aluminum flakes, 0.2 to 2 percent fatty acid lubricant, 0.1 to 3 percent of at least one wetting agent selected from the group consisting of aryl alkyl sulfonates and non-ionic ethylene oxide condensates, and 0.1 to 8 percent of at least one aluminum flake film-forming inhibitor selected from the group consisting of 3- and 5-nitrosalicylic acids.

10. Aqueous film-forming bituminous tar emulsion ready-mixed paint formulations containing aluminum flake pigmentation and exhibiting substantial freedom from pressure-development in sealed containers, said formulations consisting essentially by weight of 4 to 20 percent aluminum flakes, 0.2 to 2 percent fatty acid lubricant, 0.1 to 3 percent of at least one aluminum flake film-forming inhibitor selected from the group consisting of 3- and 5-nitrosalicylic acids, in admixture with bituminous tar emulsion film-forming vehicle having 47 to 90 percent by weight available water and 10 to 60 percent solids.

11. A method of producing a ready-mixed aluminum flake pigmented paint formulation in a water base film-forming vehicle containing 20 to 90 percent by weight available water and 10 to 60 percent by weight solids, the steps comprising, preparing a solution of water with at least one of the soluble inhibitors selected from the group consisting of 3- and 5-nitrosalicylic acids and at least one of the soluble wetting agents selected from the group consisting of aryl alkyl sulfonates and non-ionic ethylene oxide condensates dissolved therein, adding aluminum flake pigment provided with a surface layer of a fatty acid lubricant on the surfaces of the flakes to the prepared water solution to provide a synthetic aluminum flake pigment paste, and adding the paste to the water base film-forming vehicle in amount to provide a flowable ready-mixed paint formulation characterized by substantial freedom from pressure-development in sealed containers of the same.

12. A metallic flake pigment compatible with and adaptable for dispersion in water base film-forming vehicles containing 20 to 90 percent by weight available water in the production of ready-mixed metallic-pigmented coating formulations characterized by freedom from pressure-development in sealed containers of the same, said metallic pigment flakes having a thin film surface layer of fatty acid lubricant and being inhibited against destructive chemical corrosive attack by available water by at least one film-forming acidic inhibitor associated with the surfaces of the metallic flakes and selected from the group consisting of 3- and 5-nitrosalicylic acids, and said inhibitor being present in amounts of 1 to 8 percent of the weight of the metallic flakes.

13. A metallic flake pigment compatible with and adaptable for dispersion in water base film-forming vehicles containing 20 to 90 percent by weight available water in the production of ready-mixed metallic-pigmented coating formulations characterized by freedom from pressure-development in sealed containers of the same, said metallic pigment flakes having a thin film surface layer consisting by weight of 0.1 to 4 percent of at least one fatty acid lubricant selected from the group consisting of stearic, palmitic, oleic lauric and ricinoleic acids and being inhibited against destructive chemical corrosive attack by available water by at least one film-forming acidic inhibitor associated with the surfaces of the metallic flakes and selected from the group consisting of 3- and 5-nitrosalicylic acids, and said inhibitor being present in amounts of 1 to 8 percent of the weight of the metallic flakes.

References Cited by the Examiner
UNITED STATES PATENTS 2,848,344    8/1958    Brown _____ 106—290

ALEXANDER H. BRODMERKEL, *Primary Examiner.*

TOBIAS E. LEVOW, *Examiner.*

J. POER, JOAN B. EVANS, *Assistant Examiners.*